FIG. 14.

United States Patent Office 2,826,007
Patented Mar. 11, 1958

2,826,007

AUTOMATIC CONTOUR EDGE GRINDER

Warren E. Reaser, Toledo, Ohio, assignor to The Sun Tool & Machine Company, Toledo, Ohio, a corporation of Ohio Application June 25, 1956, Serial No. 593,680

10 Claims. (Cl. 51—101)

This invention relates to an automatic contour edge grinder particularly designed for automatically grinding the edges of contoured panes of plate glass and in particular those used for small windows such as ventilation vanes in automobiles.

Blanks for contoured windows are cut usually by hand or automatically to rough approximation of the finished profile of the panes of glass. Because glass has such sharp edges when it is first cut, it is necessary to grind the edges of the contoured pieces to remove the sharp edges and to prevent the creation of stress points which might cause fracture in subsequent handling.

Because the particular contour of the glass employed in a particular automobile changes from position to position within the automobile and from model to model and because the shapes of small panes of glass in different automobiles are radically different, a high speed production machine for the purpose of edge grinding must be able to automatically accommodate itself to the shape of the glass being ground.

Because the blanks are cut to only an approximation of a finished profile, a production machine for contour edge grinding also must be provided with quickly changeable means for assuring the grinding of the precise finished size and shape of the glass pieces.

A machine embodying the invention makes possible the automatic grinding of small panes of glass having a variety of different profiles according to templates establishing these profiles and requires only the change of templates in order to change from grinding one shape of glass to another. The machine has means for automatically feeding the individual panes of glass in timed sequence and in timed relationship with its controls, with means which automatically grip the glass in suitable holders, move it into and out of grinding position, apply the edge grinding means to the glass and discharge the glass after it is ground. The machine includes an automatic feeding means which supplies blanks of glass to the control feeding mechanism and it may have provision for suitably modifying the operation of the machine to accommodate pieces of glass having return curves.

The principal object of the invention is to provide a machine for the automatic contour edge grinding of small panes of glass which can be operated by a single operator whose sole duties are to place the glass upon an automatically controlled conveyor and wherein the machine according to the invention is equipped with suitable controls for delivering the glass to a controlled feeder which in turn delivers the glass to the holding and grinding sections of the machine.

It is another object of this invention to provide an automatic contour edge grinding machine for small panes of glass having odd shapes wherein the operation of the machine in its entirety is independent of the particular shape of the glass except insofar as the profile grinding operation itself is concerned.

Still another object of the invention is to provide an edge grinding machine having a high speed grinding wheel held in contact with the edge of a piece of glass being ground by gravity and moved through a path determined by a template but having provision whereby the machine operation may be modified as needed to permit the grinder to follow sharp or abrupt return curvatures.

Other and more specific objects and advantages and the cooperation of controls and mechanism whereby they are achieved according to the invention will be better understood from the specification which follows and from the drawings in which.

Figures 1, 2:
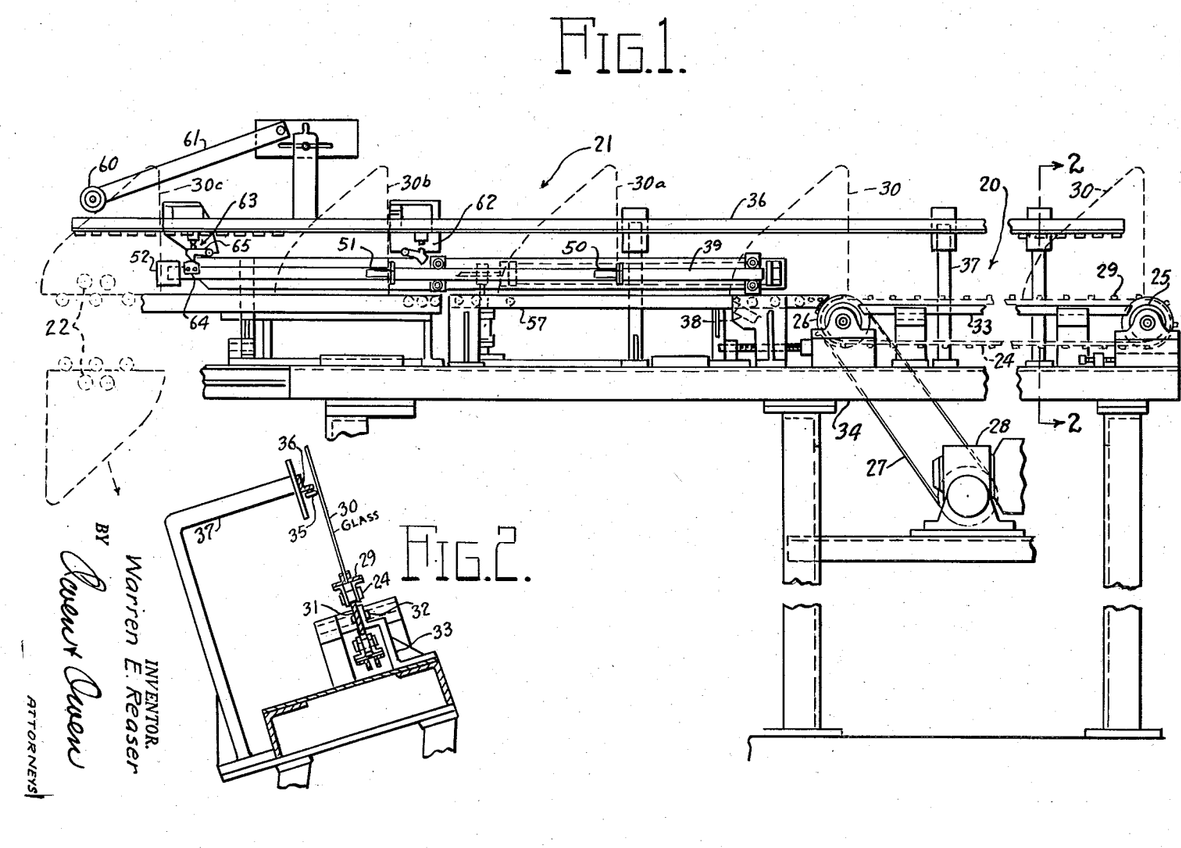
Fig. 1 is a fragmentary, simplified view in side elevation, of automatically controlled conveying and feeding means for supplying glass blanks and for feeding the glass blanks into the glass holding mechanism of a machine embodying the invention.
Fig. 2 is a fragmentary, vertical, sectional view taken along the line 2—2 of Fig. 1.
Figures 3, 4:
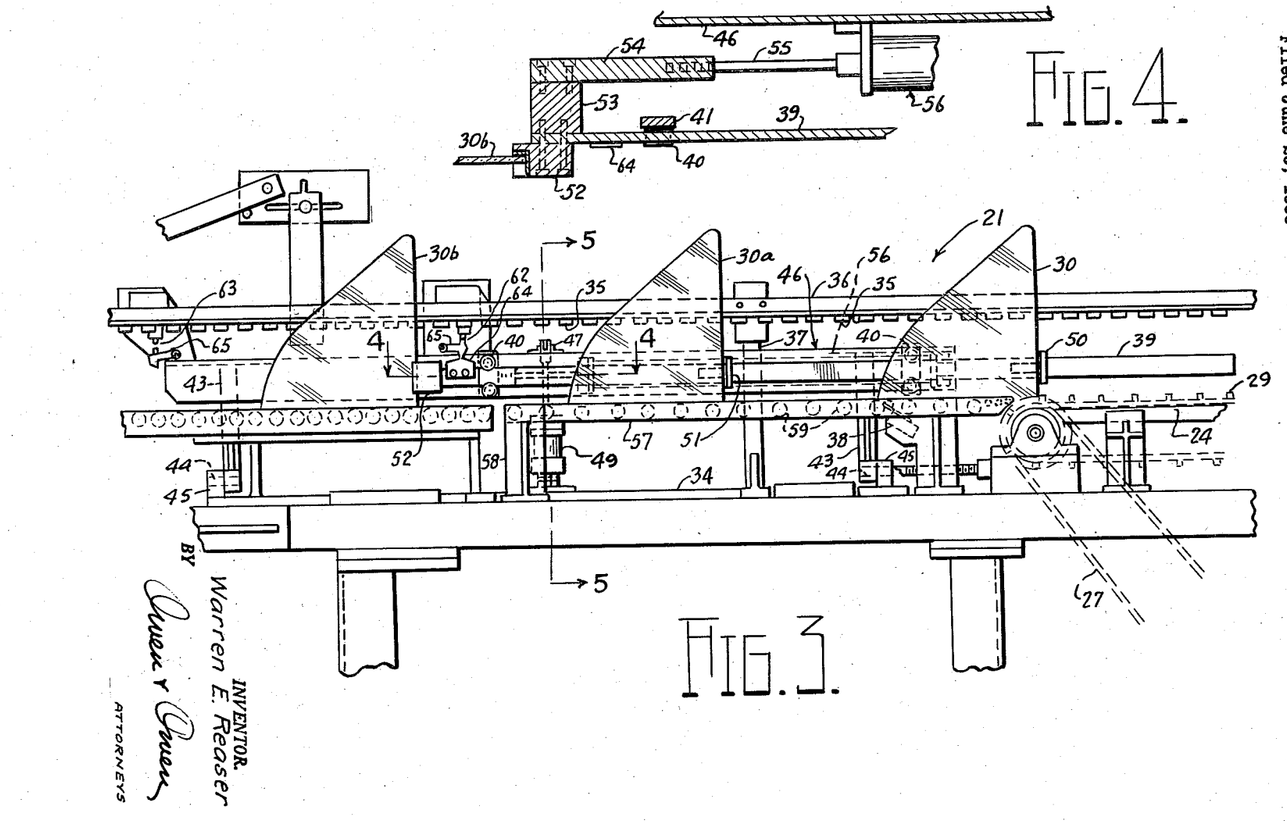
Fig. 3 is a view similar to Fig. 1 on an enlarged scale of the controlled feeding mechanism portion of a machine embodying the invention.
Fig. 4 is a fragmentary, horizontal, sectional view on an enlarged scale taken substantially from the position indicated by the line 4—4 of Fig. 3.
Figure 6:
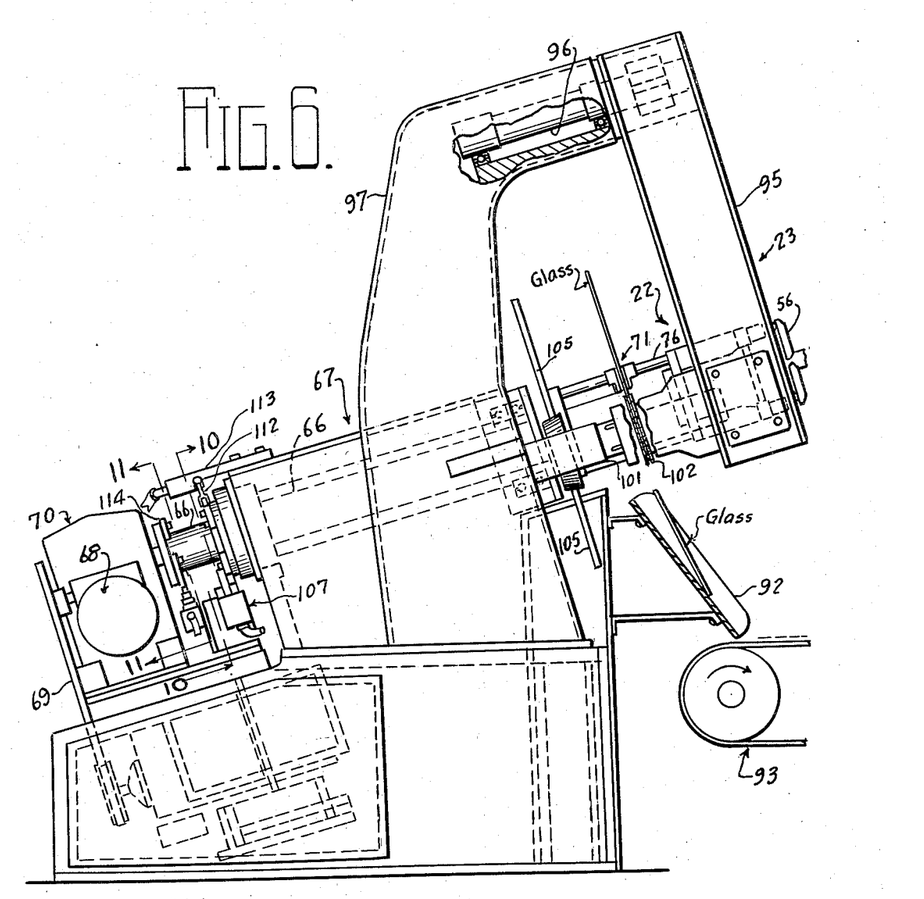
Fig. 6 is an end view in elevation of a machine embodying the invention and showing in particular the grinding wheel mounting and driving mechanism, the glass gripping mechanism and the glass movement mechanism.
Figures 7, 8, 15:
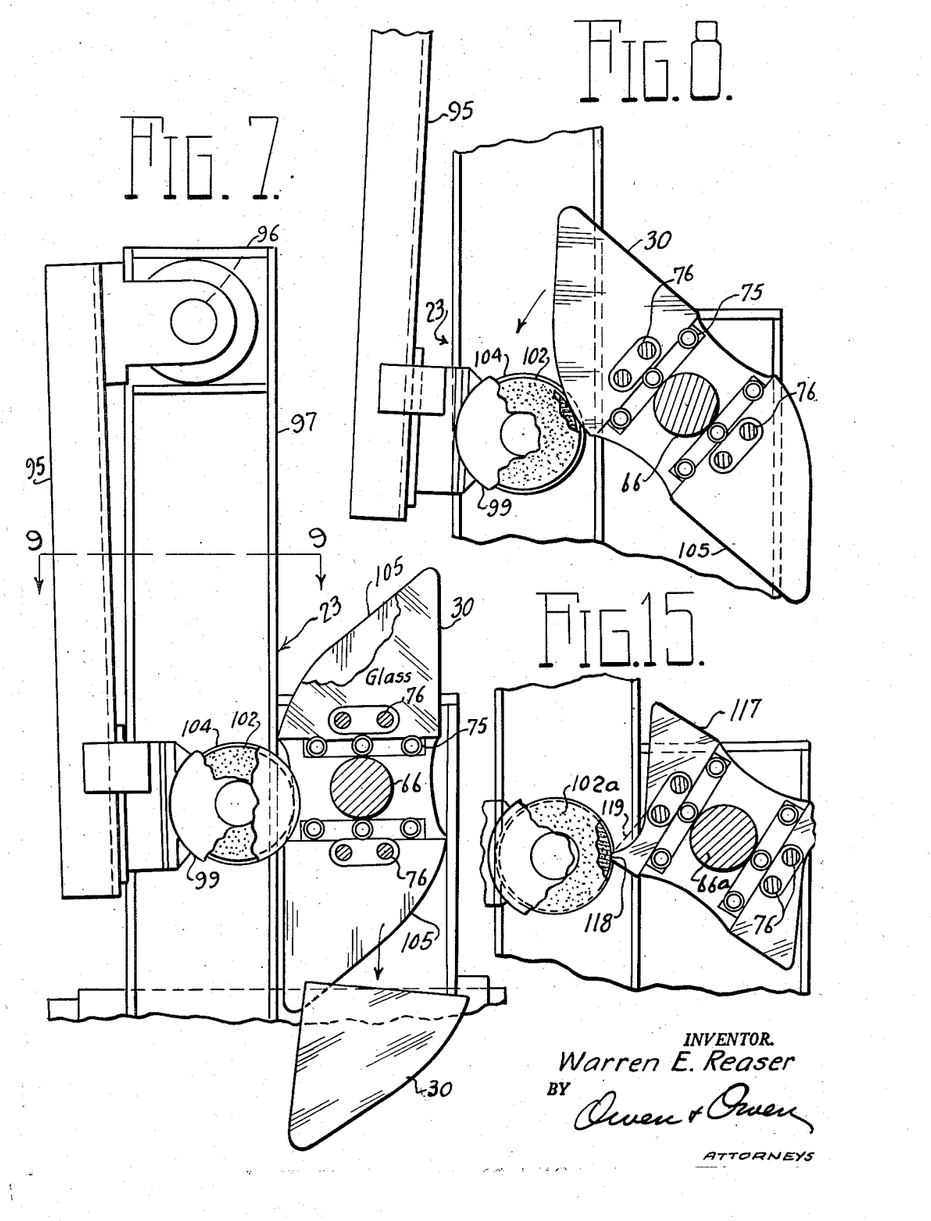
Fig. 7 is a fragmentary view partly in elevation taken generally from the front of that portion of the machine shown in Fig. 6 and illustrating in particular the relative positions of the glass holding and grinding wheel mounting mechanisms.
Fig. 8 is a fragmentary view similar to Fig. 7 but showing the apparatus in a slightly different position during the edge grinding of a piece of glass.
Fig. 15 is a fragmentary view in elevation similar to Fig. 8 but showing the grinding of a piece of glass having a relatively sharp return curvature in its contour.
Figures 12, 13:
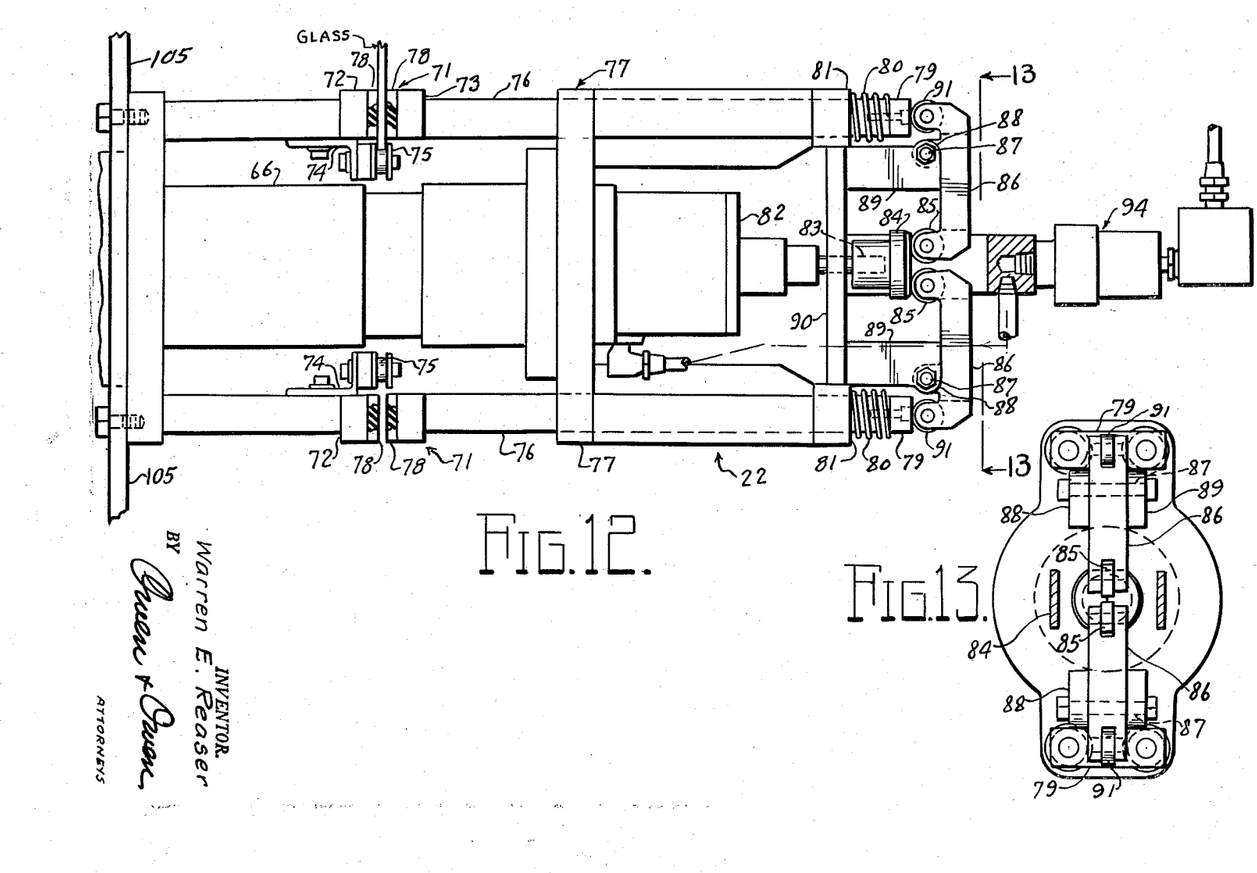
Fig. 12 is a fragmentary view in elevation illustrating the glass clamping or gripping mechanism with which a machine embodying the invention is provided.
Fig. 13 is a vertical, sectional view taken along the line 13—13 of Fig. 12.

A machine embodying the invention comprises a glass supplying conveyor generally indicated at 20 in Fig. 1, a controlled feeding mechanism generally indicated at 21 in Fig. 1, and shown in detail in Fig. 3, glass clamping mechanism which is generally indicated at 22 in Fig. 6 and shown in detail in Figs. 12 and 13, and grinding means indicated at 23 in Fig. 6 and illustrated in detail in Figs. 7 and 8.

Glass feeding mechanism

The glass supplying conveyor 20 includes an endless belt 24 mounted upon an idler wheel 25 and upon a drive wheel 26 which is driven through the medium of a belt 27 by a conveyor drive motor 28. The belt 24 mounts a plurality of spaced, resilient fingers 29 between which plates of glass to be ground, such as those indicated at 30, may be positioned by an operator. The upper span of the conveyor 24 runs on a plurality of support rollers 31 journalled on pins 32 set in an angle bracket 33 which forms a track for the upper span of the conveyor belt 24 leading horizontally along a table 34 on which the angle bracket 33 is mounted.

As can best be seen in Fig. 2, the track formed by the bracket 33 is tilted backwardly so that glass plates 30 riding in the belt 24 lie backwardly against a plurality of idler rollers 35 that are mounted by an angle iron 36 extending horizontally between support frames 37.

As will later be more fully explained with respect to the controls with which a machine embodying the invention is equipped, the conveyor belt 24 is driven at a constant speed by its motor 28 to supply panes of glass 30. A machine operator places the panes of glass in the finger 29 of the belt 24 without regard to the spacing between the individual panes of glass and the belt 24 feeds its upper span forwardly bringing these panes of glass to its left end (Figs. 1 and 2) until one of the panes of glass 30 reaches the position indicated at the right of Fig. 3 and actuates a switch 38 which stops the operation of the motor 28 and thus the feeding movement of the belt 24. When the pane of glass is moved forwardly from the position at the right of Fig. 3 by mechanism shortly to be described, its departure allows the switch 38 once again to open, re-energizing the motor 28 and feeding a subsequent piece of glass 30 to the position shown at the right in Fig. 3 which again actuates the switch 38 to again stop the glass feeding conveyor 20.

The controlled feeding mechanism 21 is aligned with the glass feeding conveyor 20 and the angle iron 36 extends along above the mechanism 21 being similarly provided with idler rollers 35 throughout its length. The mechanism 21 comprises a ram 39 which slides horizontally in two pairs of spaced grooved rollers 40 (see also Fig. 5). The rollers 40 are rotatably mounted upon suitable pins set in downwardly extending arms 41 of a rocking frame generally indicated at 42 in Fig. 5 and shown in that figure in full lines in its forward position and in broken lines in its lowered or back position.

The rocking frame 42 has a pair of legs 43 each pivotally mounted by a pin 44 which extends through a pair of spaced ears 45 erected upon the table 34. The arms 43 are connected by a heavy, horizontally extending, cross frame 46. The cross frame 46 has an upwardly and rearwardly extending flange 47 at the rear end of which is pivotally connected a piston rod 48 of a rockingly mounted pneumatic cylinder 49. Energization of the cylinder 49 to extend or retract its piston rod 48 rocks the frame 42 back and forth between the two positions shown in solid and broken lines in Fig. 5.

The ram 39 has three pushers 50, 51 and 52 on its front face. The pushers 50, 51 and 52 are spaced longitudinally along the ram 39 so as to engage the rear edges of three successively fed pieces of glass indicated at 30, 30a and 30b in Fig. 3. The front pusher 52 is bolted on the forward end of the ram 39 (see Fig. 4) and to a block 53 at the rear of the forward end of the ram 39 to which also is bolted a bar 54 connected to the front end of a rod 55 of a ram cylinder generally indicated at 56. The ram cylinder also is carried by the cross frame 46 and rocks as part of the frame 42.

A roller track 57 extends horizontally along between support brackets 58 and is aligned both horizontally and vertically with the upper span of the conveyor feeding belt 24. The track 57 mounts a plurality of horizontally spaced, aligned, flanged rollers 59 over which the pieces of glass 30, 30a and 30b are moved by the ram 39. The glass conveyor control switch 38 is mounted upon the track 57 with its actuation finger extending upwardly between a pair of the support rollers 59 so that it can be engaged by each piece of glass at the position occupied by the glass 30 in Fig. 3 to control the operation of the conveyor 20 as described above.

The ram 39 is shown in its back position in Fig. 3 and in its forward position in Fig. 1. In both of these figures the rocking frame is shown in its front position with the ram pushers 50, 51 and 52 engaged behind the edges of the respective pieces of glass being fed. As will be later described, the ram cylinder 56 is energized to thrust the ram 39 forwardly, moving each of the pieces of glass 30, 30a and 30b one position forward and thrusting the glass in the position 30b of Fig. 3 up to the position shown in dotted lines and indicated as 30c in Fig. 1. In this position the glass 30c is aligned with gripping mechanism generally indicated at 22 which clamps upon the piece of glass in the position 30c to mount and rotate it for grinding its contoured edges. When the glass is being moved by the ram 39 from the position indicated at 30b shown in Figs. 1 and 3 to the position at 30c in Fig. 1, its forward edge engages a roller 60 on the front end of a weighted arm 61 so that inertia will be prevented from carrying the glass beyond the position 30c when the ram 39 stops at the forward end of its stroke.

Control of the movement of the ram 39 and its frame 42 is determined by interlocks between ram position sensing means and the mechanism which moves the glass against the grinding wheel and during grinding and which controls the overall cycling of the machine. Included in this control mechanism are a pair of ram position sensing switches generally indicated at 62 and 63 in Figs. 1 and 3. When the ram is in its rear position as in Fig. 3, the switch 62 is closed by the engagement of a switch plate 64 that is carried near the front end of the ram 39 with an actuating finger 65 of the switch 62. The switch 62 is wired in series with one contact of the switch 38 as will be later described for the purpose of preventing the frame 42 from being rocked to its front position unless the ram 39 is at its rear position (sensed by the switch 62) and a piece of glass 30 is in feeding position (sensed by the switch 38).

As can be seen by a comparison between Figs. 3 and 1, the switch 63 is open when the ram is at its rear position in Fig. 3 and is closed by the engagement of the switch plate 64 with a finger 65 of the switch 63 when the ram is in its forward position as shown in Fig. 1. The switch 63 is interconnected with switch means controlled by the gripping mechanism 22 so that the gripping mechanism can be actuated to open or close, to receive or hold pieces of glass, in position 30c, only at the correct time intervals relative to the reciprocatory movement of the ram 39, or vice versa.

Both of the switches 62 and 63 are mounted upon and carried by the cross frame 46 of the frame 42 so that they maintain their position relative to the ram 39 for sensing its location.

Glass gripping mechanism

The gripping mechanism, which is generally indicated by the reference number 22, is mounted upon and rotates with a main spindle 66 (see Figs. 6 and following) journalled in suitable bearings and carried by a drive support frame generally indicated at 67 on an inclined axis normal to the plane of movement of the glass. The spindle 66 is rotated by a main driving motor 68 (Fig. 6) driving belts 69 which are engaged with the input side of a drive mechanism 70. The gripper mechanism 22 has two pairs of clamping jaws generally indicated at 71 (Fig. 12) each of which comprises a stationary jaw 72 and a movable jaw 73. The stationary jaw 72 carries a short angle bracket 74 in which are rotatably mounted three spaced, flanged rollers 75 similar to the flanged rollers 59 which extend along the track 57. The rollers 75 are aligned with the rollers 59 when the gripper mechanism is at its glass receiving or discharging position so that as the piece of glass in the position 30c of Fig. 1 is pushed forwardly by the front pusher 52 on the ram 39, it rolls off the end of the track 57 and onto the rollers 75. Gravity is relied upon to settle the piece of glass in the position 30c on the three rollers 75 of the jaw 71.

The gripper mechanism 22 also comprises two sets of spaced thrust rods 76 slidably carried in frame brackets 77 mounted upon opposite sides of the spindle 66. The movable jaws 73 are fixed on the rear ends of the thrust rods 76. Each of the jaws 72 and 73 is padded on its inner end by, for example, rubber pads 78, between which the panes of glass 30 being ground are gripped.

The front ends of each pair of thrust rods 76 are linked by a cross bar 79 and biased toward forward ("clamp open") position by coil springs 80 surrounding the rods 76 and positioned between shoulders 81 on the brackets 77 and the cross bars 79.

An air cylinder 82 is mounted at the center of the brackets 77 on the front end of the spindle 66 and its piston rod 83 carries a yoke 84 on its front end. The yoke 84 is engaged with rollers 85 on the inner ends of radially extending actuating levers 86. The actuating levers 86 are pivoted upon pins 87 extending between spaced ears 88 on the front ends of arms 89 welded or otherwise secured upon a cross plate 90 of the brackets 77. A roller 91 is mounted in the outer end of each of the levers 86 and bears against its respective cross bar 79.

Actuation of the air cylinder 82 thrusts the yoke 84 forwardly pivoting the levers 86 and thrusting the rods 76 backwardly to clamp pieces of glass between the sets of jaws 71. Relieving the pressure in the cylinder 82 allows the springs 80 to open the jaws 71.

The two opposed sets of jaws 71 are closed and opened simultaneously. That one of the jaws 71 in upper position, i. e., aligned with the glass track 57, opens to receive an unground piece of glass and the lower one of the jaws 71 opens to discharge a piece of glass after it has been ground. When the jaws 71 close the jaw 71 in upper position grips a piece of glass in position 30c (Fig. 1) and carries it through a grinding cycle while the lower one of the jaws 71 closes on nothing and swings around up to glass receiving position. As can best be seen by reference to Fig. 6, a glass receiving chute 92 is mounted on the front end of the frame 67 beneath the gripping mechanism 22 so that it receives discharged pieces of glass and directs them onto a glass conveyor fragmentarily indicated at 93.

The front of the yoke 84 carries a pressure responsive valve 94 pneumatically connected with the clamping air cylinder 82 so that the cycling of the machine to grind a piece of glass clamped in the upper clamp jaws 71 will not be initiated until the pressure in the cylinder 82 reaches a specified minimum, thus insuring the secure holding of the glass being ground.

Grinding means

Figures 9, 10, 11:
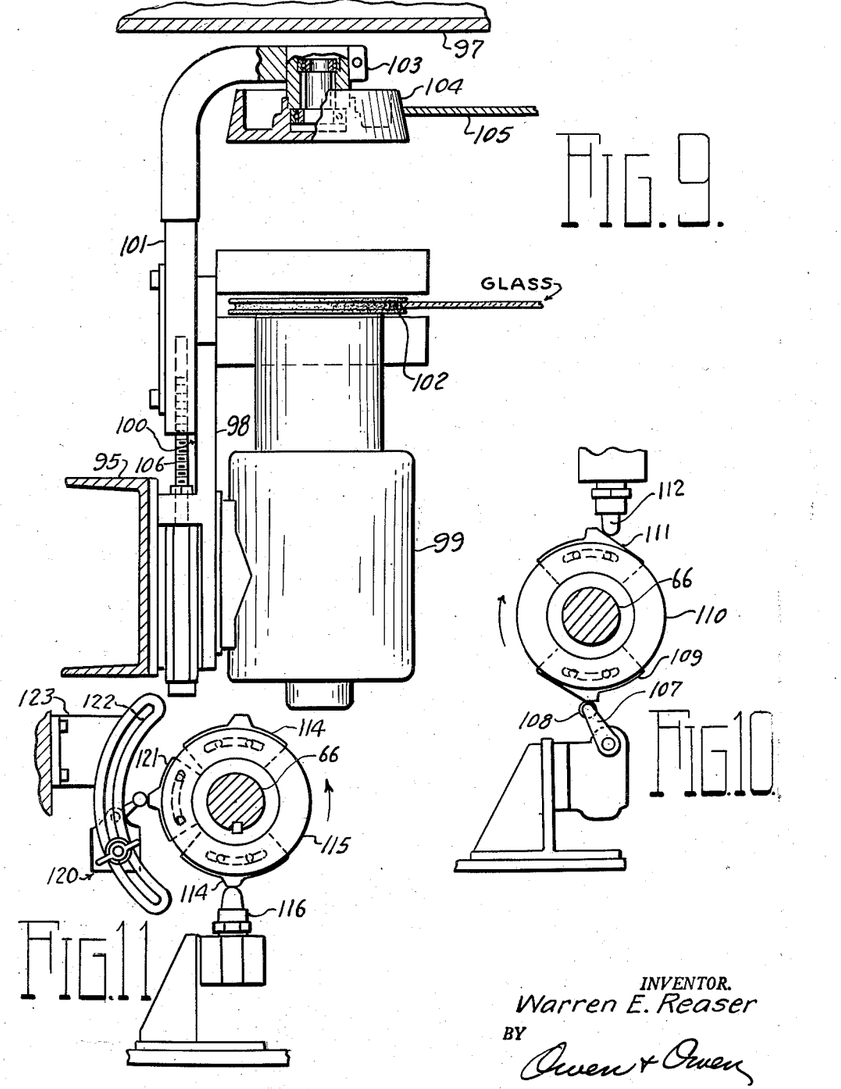
Fig. 9 is a fragmentary, horizontal, sectional view on an enlarged scale taken generally from the position indicated by the line 9—9 of Fig. 7.
Fig. 10 is an enlarged vertical, sectional view taken along the line 10—10 of Fig. 6.
Fig. 11 is a view similar to Fig. 10 taken along the line 11—11 of Fig. 6.

The grinding means 23 is shown in detail in Figs. 7–9. A swinging arm 95 is pivotally supported by a heavy stub shaft 96 (Fig. 6) in an upper arm 97 of the support frame 67. At the lower end of the arm 95 (Fig. 9) a fore and aft base 98 mounts a grinding wheel drive motor 99 and has ways, generally indicated at 100, on which a rearwardly extending bracket 101 is adjustably slidable. The motor 99 drives a grinding wheel 102 which has a grooved periphery lying in the same plane as the panes of glass to be ground and which is pressed against the edges of the glass being ground by gravity tending to swing the arm 95 in a counterclockwise direction (Figs. 7 and 8). The bracket 101 extends rearwardly of the grinding wheel 102 and has a turned over end 103 in which a template contactor 104 is rotatably journalled. The template contactor 104 has a frusto-conical periphery which engages the edge of a template 105. The template 105 has a profile identical in contour and size with that of the finished, ground, piece of glass. Two templates are used in a machine according to the invention, one of them being bolted at each opposite side of the spindle 66 (see Fig. 6).

As the spindle 66 turns, moving in a counterclockwise direction (Figs. 7 and 8), the template 105 swings against the template contactor 104 moving the arm 95 and carrying the grinding wheel 102 through a path controlled by the engagement of the template contactor 104 with the template 105. Since the template contactor 104 and the grinding wheel 102 are co-axial the edge of the piece of glass 30 being ground is cut to a profile determined precisely by the template 105.

As the grinding wheel 102 is reduced in diameter due to continued usage, it would normally grind the panes of glass 30 to a size larger than that of the template 105. The reduction in diameter of the grinding wheel 102 is compensated for by axial adjustment of the template contactor 104. Means for this axial adjustment comprises an adjustment screw 106 (Fig. 9) threaded into the forward end of the bracket 101 and extending through the base 98 toward the front of the motor 99. By turning the adjustment screw 106, the bracket 101 is shifted on the way 100 to move the template contactor 104 axially and thus reduce or enlarge its effective size contacting the template 105. As the grinding wheel becomes smaller in diameter the template contactor 104 is moved axially forward reducing its diameter of contact a similar amount.

Rotation of the spindle 66 and thus revolution of a pane of glass 30 through a half turn from the position shown at the top of Fig. 7, i. e., its entry position into the glass clamp 71, to the bottom position of Fig. 7 where it is discharged as a finished piece of glass, is controlled by cam actuated switches and valves located at the rear of the spindle 66 and controlled by cams mounted upon the spindle 66. The spindle 66 is driven through the medium of a clutch (not shown) and included within the driving housing 70. The motor 68 constantly runs but the spindle 66 is rotated only when the clutch is engaged. Engagement and disengagement of the clutch is controlled by a clutch switch 107 (Figs. 6 and 10) having an actuator arm 108 which rides the surface of a cam 109 mounted upon the spindle 66. When the cam 109 strikes the arm 108 it declutches the drive to the spindle 66. The cam 109 is angularly adjustable relative to the spindle 106, being bolted to a cam mounting disk 110 on the spindle 66. The disk 110 mounts a second similar cam 111 on its opposite side and the cams 109 and 111 also actuate a switch plunger 112 mounted upon an arm 113 (Fig. 6) overlying the spindle 66. The switch 112 actuates a spindle brake (not shown) included in the driving housing 70 for stopping the spindle 66 at its precise half revolution positions.

The switches 107 and 112 are so located angularly relative to each other that the spindle 106 is declutched by actuation of the switch 107 just shortly prior to the closing of the switch 112 to apply the brake for stopping the rotation of the spindle 66. By declutching the spindle 66 it is allowed to coast for the last few degrees of its rotation and thus can be stopped accurately by application of the brake. The necessary coasting time and the precise positioning of the spindle 66 at the end of each half revolution are adjusted and set by adjusting the two cams 109 and 111 relative to the switch 107 and switch 112 which they control. Rotation of the spindle 66 in Fig. 10 is in a clockwise direction.

A second pair of control cams 114 (Figs. 6 and 11) are mounted on a cam mounting disk 115 adjacent the disk 110 on the spindle 66. The two cams 114 actuate a ram stroke control valve 116 to connect the ram cylinder 56 for moving the ram 39 back and forth between the rear position of Fig. 3 and the forward position of Fig. 1. The cams 114 are so positioned angularly on the disk 115 relative to the brake and clutch control cams 107 and 111 that the valve 116 is shifted to admit air to the cylinder 56 for returning the ram 39 to its rear position just before the spindle 66 comes to a stop. As will later be explained, the return stroke of the ram 39 is followed, in normal operation, by the admission of air to the ram raising cylinder 49 (Fig. 5) which swings the ram and its mounting mechanism up into glass contacting position and this is followed by a forward stroke of the ram caused by the actuator of the valve 116 dropping off its cam 114 as the spindle 66 comes to a stop.

Figure 5:
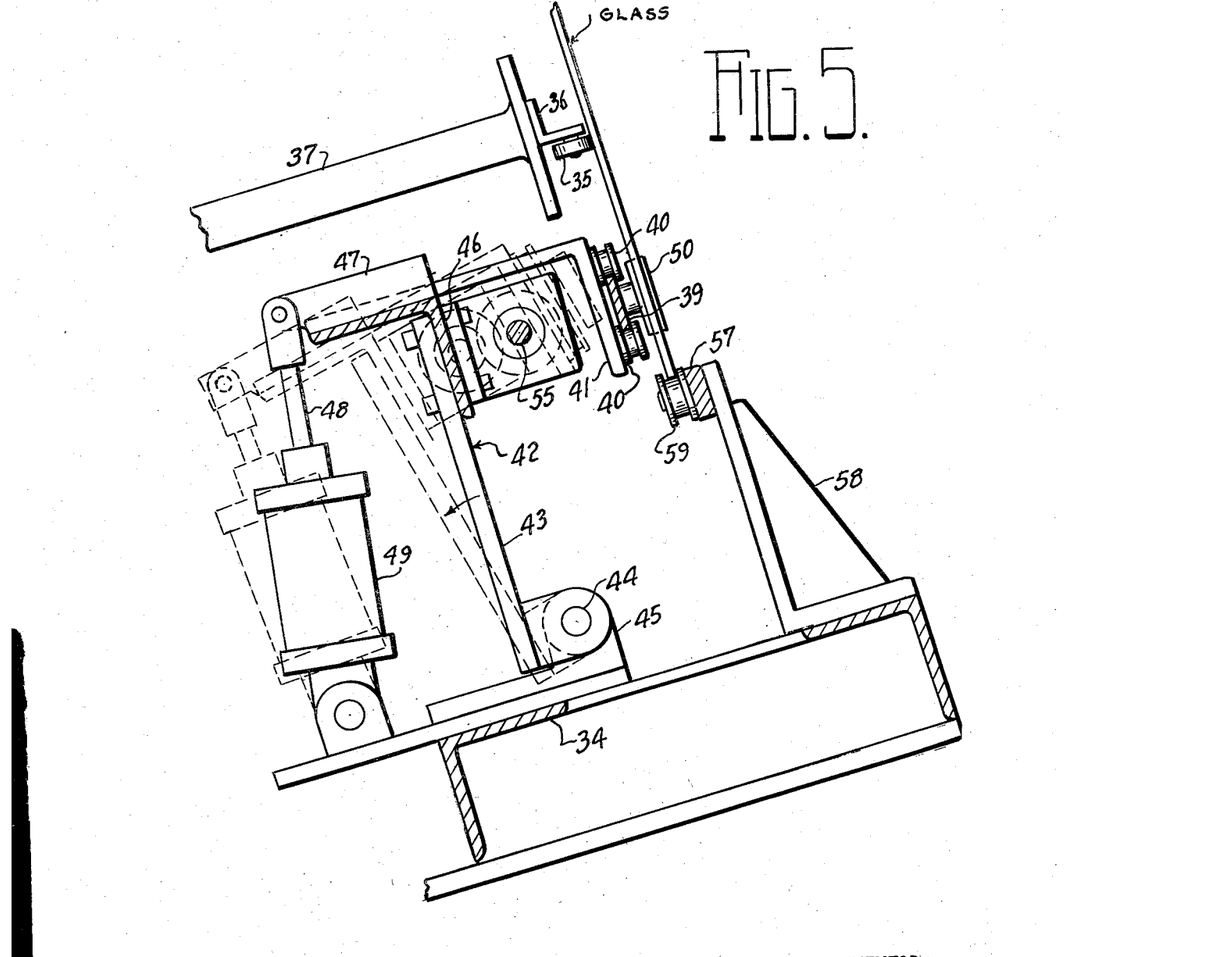
Fig. 5 is a transverse, fragmentary, vertical, sectional view taken along the line 5—5 of Fig. 3.

In normal operation, therefore, the ram 39 feeds the glass at the position 30b forwardly to position 30c (Fig. 1) and into the gripper mechanism 22, actuating the switch 63 which results in the reversal of air to the ram raising and lowering piston 49 so that immediately after the glass is delivered to position 30c the ram is lowered backwardly to the dotted line position in Fig. 5. The ram 39 and its rocking frame 42 stay in this forward but lowered position during the grinding of a piece of glass and are not actuated again until just before the spindle completes its half revolution. The sequence will be further explained below with respect to the wiring diagram of Fig. 14.

In some instances, where the pieces of glass being contour ground have rather abrupt return curves, as illustrated, for example, in Fig. 15, an additional spindle control is employed. In Fig. 15 a piece of glass indicated at 117 is shown in position part way through a grinding cycle. In this figure, as in Figs. 7 and 8 the spindle 66a is rotating in a counterclockwise direction. The grinding wheel is shown as grinding the relatively short radius corner 118 of the glass 117. Since the spindle 66a rotates at a constant rate of speed and since gravity tends to swing the grinding wheel 102a to the right, unless the speed of rotation of the spindle 66a is modified, the grinding wheel 102a tends to be lofted off the corner 118 and to follow a path generally indicated by a broken line numbered 119.

In order to prevent the grinding wheel 102a from being thus lofted radially outside the contour established by the template corresponding to the glass 117, apparatus according to the invention has a spindle drive interruption means controlled by a switch 120 (Fig. 11) that is actuated by a cam 121 carried by the cam disk 115. The switch 120 is adjustably positionable in an arcuate slot 122 concentric with the spindle 66 and mounted thereadjacent upon a bracket 123. The switch 120 is clamped in the arcuate slot 122 but may be moved therein so that it can be set to be engaged by its cam 121 at any desired location. When the switch 120 is engaged, it breaks a circuit to the clutch, disconnecting the main drive motor 68, so that the spindle 66 coasts under its own momentum. The switch 120 also energizes a timer which is set to run for a period of time necessary to allow the spindle to coast to bring the grinding wheel 102a (Fig. 15) around the tight corner and into engagement with the return curvature of the contour being ground. When the timer finishes its cycle it times itself out of circuit and reestablishes the circuit to the clutch so that the spindle 66 again is driven by its main motor 68.

Control circuit

Figure 14:
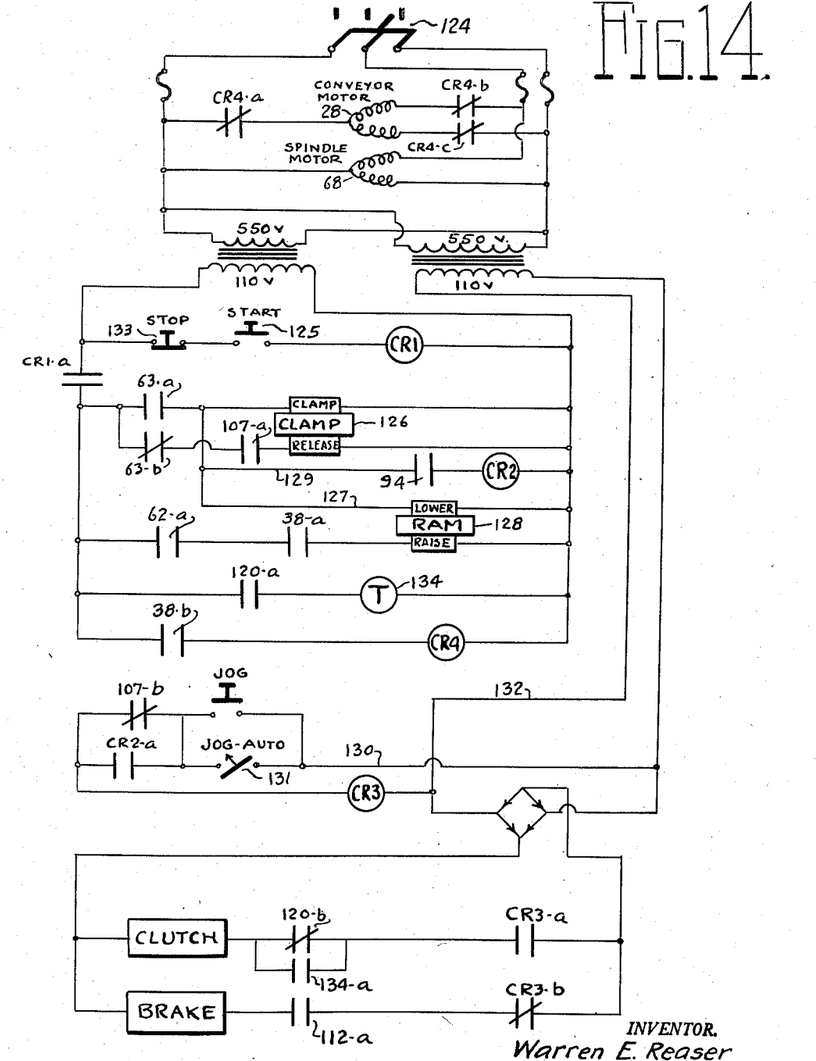
Fig. 14 is a schematic wiring diagram illustrating the inter-relationship of the controls for the operation of a machine embodying the invention.

Referring now to the schematic wiring diagram of Fig. 14, a cycle of operations will be described.

The entire circuit is controlled by a master switch 124, the closing of which establishes current in the various branch circuits of the machine, including the motor 28 for the glass feeding conveyor 24 and the main spindle drive motor 68. With no glass in the machine at all, the conveyor motor 28 immediately starts to operate to feed glass along the upper span of the conveyor belt 24. Through the medium of suitable transformers, current is fed to both halves of the wiring diagram of Fig. 14.

Operation of the machine in addition to the conveyor 20 is under control of a start button 125. When the button 125 is closed it energizes the coil of a control relay CR1 which closes its normally open contact CR1a establishing current in the ram and clamp circuit of the mechanism. Assume now that the ram is at its forward position with the switch 63 contacted by the switch plate 64 on the ram 39. Under these conditions normally open contacts 63a are closed and normally closed contacts 63b are open. Current flows through 63a to a control valve 126 for the glass clamping mechanism to admit air to the cylinder 82 and close the pairs of jaws 71. Current also flows through a line 127 to a valve 128 controlling the ram raising and lowering cylinder 49. This lowers the ram to its back position.

As air pressure builds up in the clamp cylinder 82, it finally reaches the minimum pressure needed, actuating the pressure valve 94 and closing its normally open contacts so that current flows through a lead 129 to the coil of control relay CR2. When control relay CR2 is energized it closes its normally open contacts CR2a and current flows from a secondary 110 volt circuit through a side lead 130 to a "Jog-auto" switch 131. If the switch 131 is set at "automatic," current flows through the now closed contacts CR2a to the coil of control relay CR3 and to a secondary 110 volt line 132 establishing a circuit energizing the coil of CR3 and closing its normally open contacts CR3a and opening its normally closed contacts CR3b. This engages the clutch and disengages the brake. When the clutch is engaged to the already running main drive motor 68 the spindle 66 starts to rotate.

As soon as the spindle 66 starts to rotate the clutch switch 107 drops off its cam 109 closing its normally open contacts 107a and opening its normally closed contacts 107b. At this position in the cycle the change of these two contacts of the switch 107 has no effect upon the operation of the machine. The contact 107a is not in circuit because the ram 39 is at forward position holding the contacts 63b of the switch 63 open. Similarly, opening the contacts 107b has no effect because the contacts CR2a of control relay CR2 are closed as long as CR2 remains in circuit through the contacts 63a of the switch 63.

The spindle 66 rotates through its half revolution. If glass is present in the jaw 71 it is ground but if the machine has just been started, this first half revolution would take place with no glass in the clamp passing the grinding wheel 102. As the spindle approaches completion of a half-rotation, the clutch switch 107 rides up on its cam 109. This closes the contacts 107a and opens the contacts 107b. Closing the contacts 107a pre-sets a circuit through the release side of the clamp valve 126. Opening the contacts 107b pre-sets the circuit to the coil of control relay CR3 to disengage the clutch. Immediately thereafter the ram stroke control valve 116 rides up on its cam 114 and reverses the connections to the ram cylinder 56 starting the ram 39 backwardly.

As soon as the ram 39 leaves its forward position, its switch plate 64 is moved from beneath the finger 65 of the switch 63 and the contacts 63a and 63b are reversed, opening contacts 63a and closing contacts 63b. When the contacts 63b are closed it establishes a circuit through the now closed contacts 107a to the release side of the clamp control valve 126. This drops the pressure in the clamp cylinder 82 and the pressure responsive switch 94 opens. Simultaneously therewith, the contacts 63a have opened and the coil of control relay CR2 is de-energized. This opens the contacts CR2a, de-energizing the coil of the control relay CR3 and opening its contacts CR3a and closing its contacts CR3b. Opening the contacts CR3a disengages the clutch and the spindle 66 starts to coast. When the contacts 63a opened, the ram raising and lowering control valve 128 was de-energized on the "ram lower" side. The glass clamps having been released, and the spindle now coasting to a stop, the apparatus is ready for a ram stroke cycle and the feeding of a piece of glass forwardly into operative position.

If no glass has been present on the switch 38 during the preceding described operation, that switch has remained with its contacts 38a and 38b open and the coil of the control relay CR4 has thus not been energized to open its normally closed contacts CR4a, CR4b and CR4c. For this reason the conveyor motor 28 has been running to feed glass forwardly into the control feeding mechanism 21. As soon as the first pane of glass reaches the position occupied by the glass eneumerated 30 in Fig. 1, the switch 38 is closed. This closes its two sets of normally open contacts 38a and 38b. Closing the contacts 38a pre-sets the circuit to the ram raise side of the ram raising and lowering control valve 128. Closing the contacts 38b energizes the coil of control relay CR4 opening its normally closed contacts CR4a, CR4b and CR4c and de-energizing the conveyor motor 28.

Of course, in usual operation, the operator would have placed three pieces of glass in the positions 30, 30a and 30b on the track 57 before the operation of the machine was started so that the conveyor motor 28 would be allowed to run only as needed to replace pieces of glass fed away from the position occupied by the position of the glass 30 in Fig. 1 as the machine continued to operate.

Assuming now that there is a piece of glass in position 30 of Fig. 1 and that the contacts 38a and 38b of switch 38 are both closed, when the ram 39 is moved into back position the switch plate 64 strikes the finger 65 of the switch 62. This closes the normally open contacts 62a of the switch 62 and establishes the circuit through the contacts 38a (closed by the glass in position 30) to the "raise ram" side of the control valve 128. This admits air to the cylinder 49 rocking the ram 42 upwardly so that the ram pushers 50, 51 and 52 are positioned behind the back edges of the three pieces of glass in positions 30, 30a and 30b.

As the spindle 66 continues to coast, the ram stroke control valve 116 rides off its cam 114 reversing the pneumatic connections to the ram cylinder 56 and pushing the ram 39 forwardly. As this takes place the spindle 66 has completed its coasting travel and the cam 111 closes the switch 112 closing the circuit through the contacts CR3b and applying the brake to the spindle 66. The spindle 66 comes to a stop at the position controlled by the cam 111, which position is indicated in Fig. 1 with the rollers 75 carried by the jaws 71 aligned with the glass track 57. The final several inches of movement of the ram 39 forwardly pushes the glass into the position 30c of Fig. 1 off the end of the track 57 and onto the rollers 75 between the jaws 71.

Upon completion of this forward stroke of the ram 39 its switch plate 64 again contacts the fingers 65 of the switch 63 reversing the setting of the contacts 63a and 63b and initiating a clamping of the glass in place and a subsequent half revolution cycle of the machine.

The apparatus also has a stop button 133 connected in series with the start button 125 so that any place in the operation the machine may be stopped by breaking the circuit through the coil of control relay CR1 and opening its main control contacts CR1a.

When the machine is to grind the edges of glass pieces having contours such as those illustrated in Fig. 15 and in order to accomplish the special control described above with respect to Fig. 15, the switch 120 is adjusted on its bracket 123 so that it will be engaged by the cam 121 at the proper angular position of the spindle 66. This closes its contacts 120a, energizing a timer 134 and opens its normally closed contacts 120b to break the circuit to the clutch. After the timer 134 has timed out, it closes its normally open contacts 134a re-establishing the circuit through the clutch and these contacts 134a are held closed by the timer until the switch 120 rides off the cam 121 opening the contacts 120a to the timer 134 and closing the contacts 120b to replace the timer contacts 134a in the clutch circuit.

*Bottom edge grinding attachment*

Figures 16, 17, 18:
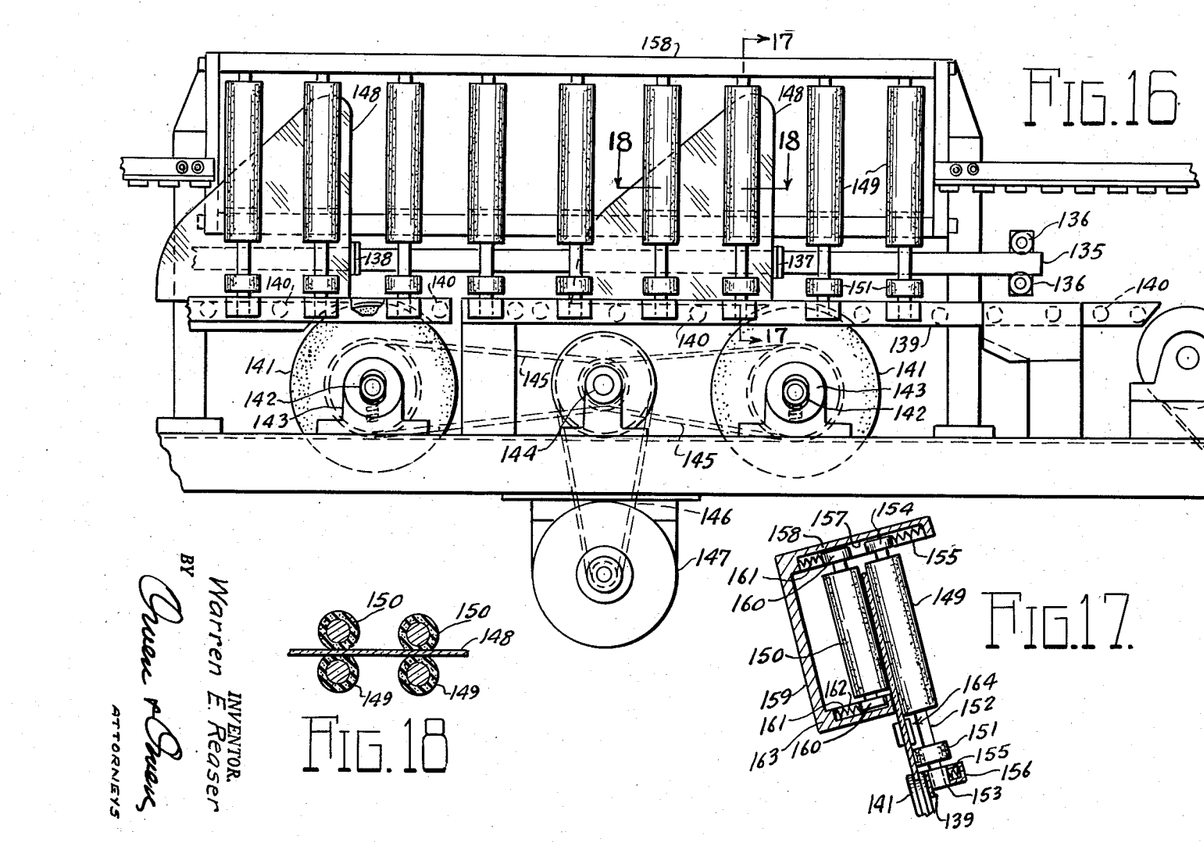
Fig. 16 is a view similar to Fig. 3 but showing a modification of the control feeding means as provided with auxiliary grinding means for smoothing the bottom edge of panes of glass.
Fig. 17 is a fragmentary, vertical, sectional view taken along the line 17—17 of Fig. 16.
Fig. 18 is a fragmentary, horizontal, sectional view taken along the line 18—18 of Fig. 16.

A machine embodying the invention may be equipped with an attachment for grinding the bottom edges of pieces of glass as they are moved along the glass track 57 leading to the rotary grinding mechanism described above. Such an auxiliary attachment is illustrated in Figs. 16, 17 and 18 where a portion of the machine through which the pieces of glass are moved by the ram is shown. In Fig. 16 a ram 135 is fragmentarily shown as being supported by and reciprocal in support rollers 136. The ram 135 has glass pushers 137 and 138. When this attachment is employed in a machine embodying the invention a special glass track 139 having rollers 140 is employed. In the glass track 139 there are two semi-circular recesses and the rollers 140 are spaced slightly apart on opposite sides of these recesses. An edge grinding wheel 141 is journalled by upwardly biased bearings 142 in a pillow block 143 at each of the two openings in the track 139. The two grinding wheels 141 may both be driven from a single jackshaft 144 by belts 145 and the jackshaft 144 in turn driven by a belt 146 from a motor 147 supported by the main table of the machine.

In order to hold panes of glass 148 during the grinding of their bottom edges this auxiliary apparatus is provided with a plurality of relatively soft rubber rollers 149, 150 and 151. The rollers 149 and 151 are mounted in series upon shafts 152 journalled in spring pressed bearings 153 and 154. The bearings 153 and 154 are urged inwardly toward the plane of the glass 148 by compression springs 155. The bearings 153 are mounted in individual blocks 156 spaced along the front of the glass track 139 and the upper bearings 154 are slidable in slots 157 in the overhanging arms 158 of C-brackets 159. The rollers 150 are similarly mounted by sliding bearings 160 but are urged forwardly by coiled springs 161 in the slots 157 and a similar slot 162 in a lower arm 163 of the C-brackets 159. The front rollers 149 and 151 are vertically spaced from each other leaving a recess generally indicated at 164 through which the glass pushers 137 and 138 may pass during the forward stroke of the ram 135.

The sets of rollers 149, 150 and 151 are so spaced along the track 139 that each piece of glass 148 is engaged by at least two sets of rollers 149—151 at all times when its lower edge is engaged with one of the grinding wheels 141. By mounting the grinding wheels 141 upon upwardly biased bearings 142 minor irregulari ties in the undersurface of the glass 148 will not cause it to be displaced upwardly so that it would run out of the roller sets.

After having been fed through the soft, holding roller sets 149—151, in the positions 30a and 30b, the glass pieces 148 pass beyond the bottom edge grinding attachment of Fig. 16 as they are finally pushed into the forward position 30c where they are clamped in the gripping mechanism 22.

I claim:

1. Apparatus for grinding the curved edges of pieces of glass to a predetermined contour, said apparatus comprising, in combination, a rotary spindle, a glass holding clamp on said spindle, means for opening and closing said clamp for receiving, holding and discharging pieces of glass therein and therefrom, an edge grinding wheel adapted to bear against the edge of a piece of glass mounted in said clamp, a template removably mounted on said spindle in line with a piece of glass in said clamp, a template contactor aligned with said grinding wheel and adapted to contact said template for controlling the path of said grinding wheel in accordance therewith, glass feeding means for repeatedly feeding pieces of glass into said clamp in phase with the opening thereof, and control means effected by the position of said spindle for actuating said glass feeding means.

2. Apparatus according to claim 1 and power means for rotating said spindle comprising a constantly running motor, a clutch for engaging said spindle to said motor and a brake for said spindle, and control means for said clutch and said brake carried by said spindle and effective to disengage said clutch at approach of said spindle to glass receiving position and to engage said brake upon upon arrival at glass receiving position.

3. Apparatus according to claim 2 and an anuxiliary control for disengaging the clutch at any selected position in the rotation of the spindle and for holding said clutch disengaged for a determined period and then re-engaging said clutch, whereby said spindle is caused to coast for a predetermined time as required to slow up the rotation of said spindle to facilitate the action of the template contactor in following the contour template.

4. Apparatus according to claim 1 and additional control means responsive to the position of the clamp for preventing rotation of said spindle until a piece of glass in said clamp is firmly gripped therein.

5. Apparatus according to claim 4 and control means responsive upon arrival of a piece of glass into clamping position for actuating the clamp and establishing a circuit for re-engaging the clutch upon completion of the clamping of said glass in said clamp.

6. Control means for apparatus of the class described having a grinding wheel, a rotary spindle, a glass holding clamp on said spindle, means for delivering a piece of glass into said clamp, a motor for said spindle, a clutch for engaging said motor for rotating said spindle and a brake for stopping said spindle, said control means comprising, means effective upon arrival of a piece of glass in clamping position for actuating said clamp to hold said glass, means effective upon closure of said clamp for engaging said clutch for driving said spindle for moving said glass against said grinding wheel, means on said spindle for disengaging said clutch near the end of a grinding operation, glass feeding means, means on said spindle for actuating said glass feeding means, means on said spindle for engaging said brake shortly after disengagement of said clutch for stopping said spindle in glass receiving position and means actuated by said glass feeding means for opening said clamp for discharge of the ground piece of glass and receipt of a following piece of glass.

7. In apparatus of the class described having an openable glass clamp mounted on a rotary spindle, a glass track leading to and aligned with said clamp when in open glass receiving position, a reciprocatory glass feeder movable along a path adjacent said track, a glass engager on said feeder for engaging the edge of a piece of glass on said track for feeding the same therealong, auxiliary glass supply means for moving a piece of glass onto said track as a preceding piece is fed therealong by said feeder, control means effected by the position of said spindle for actuating said glass feeder when said clamp arrives at glass receiving position and interlocked control means effected by the position of said feeder for opening and closing said clamp and for over-controlling the reciprocation of said feeder.

8. Apparatus according to claim 7 in which the glass track has a first station onto which said auxiliary glass supply means feeds a piece of glass and a switch at such first station for controlling the operation of said auxiliary glass supply means in accordance with the presence of a piece of glass at said first station.

9. Apparatus according to claim 8 in which the auxiliary glass supply means comprises a driven continuous belt aligned with and at one end of the glass track and the switch energizes means for driving said belt whenever no glass is present on the end of said track.

10. In apparatus of the class described, a glass feeder comprising a track, a ram slidable along said track for feeding a piece of glass from a first end of said track along and off of the other end into a spindle glass clamp, said ram having a glass engaging finger adapted to engage a piece of glass on said track and move such piece of glass along said track, a tiltable guide frame for said ram movable from a front position with said ram immediately behind said track and a rear position with said ram spaced from said track a distance sufficient for said ram to return with said finger out of line of engagement with a piece of glass on said track, means for reciprocating said ram, means for rocking said guide frame between front and rear positions, control means actuated by said apparatus and by means responsive to the position of said ram for reciprocating said ram and for rocking said guide frame, and switch means responsive to the presence of a piece of glass on the first end of said track and interlocked with said means responsive to the position of said ram for preventing the rocking frontward of said guide frame in the absence of a piece of glass from the first end of said glass track.

References Cited in the file of this patent
UNITED STATES PATENTS

| | | |
|---|---|---|
| 2,579,337 | Reaser et al. | Dec. 18, 1951 |
| 2,597,180 | Reaser et al. | May 20, 1952 |